Sept. 1, 1931.   A. P. ARMINGTON   1,821,869
DRAWBAR MEANS
Filed Nov. 22, 1929   2 Sheets-Sheet 1
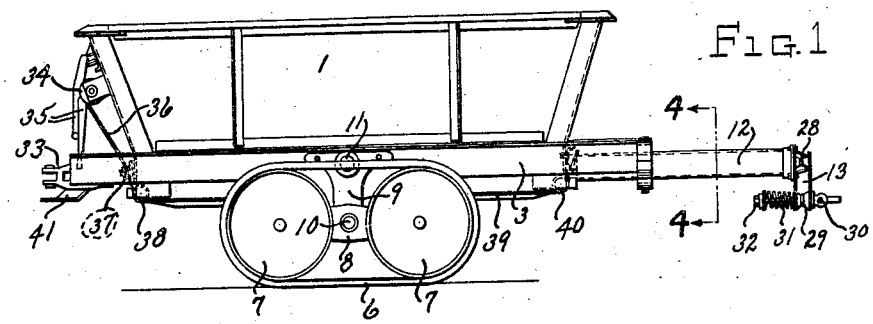
Fig.1
Fig.2
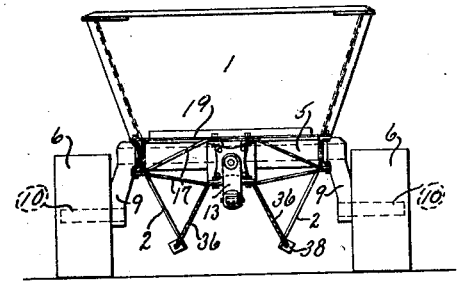
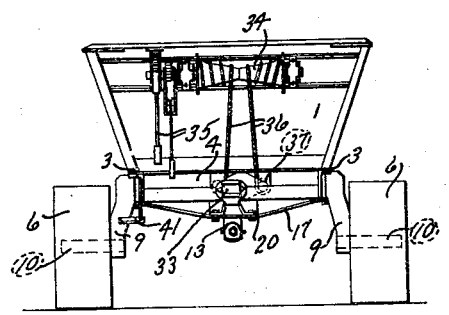
Fig.3
INVENTOR
Arthur P. Armington
BY
Brockett, Hyde, Higley & Meyer
ATTORNEYS Sept. 1, 1931. A. P. ARMINGTON 1,821,869
DRAWBAR MEANS
Filed Nov. 22, 1929 2 Sheets-Sheet 2

INVENTOR
Arthur P. Armington
BY
Brockett, Hyde, Higley & Meyer
ATTORNEYS

Patented Sept. 1, 1931

1,821,869

UNITED STATES PATENT OFFICE

ARTHUR P. ARMINGTON, OF WILLOUGHBY, OHIO, ASSIGNOR TO THE EUCLID CRANE & HOIST COMPANY, OF EUCLID, OHIO, A CORPORATION OF OHIO

DRAWBAR MEANS

Application filed November 22, 1929. Serial No. 409,076.

This invention relates to heavy-duty commercial vehicles and has particular application to bottom dumping vehicles of the cart type, that is of the type characterized by single central axle means as distinguished from the wagon type wherein a pair of longitudinally spaced axle means are employed.

In the type of vehicle to which this invention more particularly pertains it is customary to provide a rigid frame for supporting a load-containing hopper, and to hinge dumping doors as to the frame, preferably to swing upon the side members thereof between load-carrying and dumping positions. The frame is necessarily elevated that the doors may clear the ground in dumping position and is usually supported through its single axle means upon endless tread crawler assemblies instead of wheels. Rigidly associated with the frame is drawbar means by which draft is applied to the vehicle and by which when operated the tilt of the vehicle upon its running gear is controlled.

Where a number of such vehicles are to be employed in a train obviously the rear hitch of each is preferably in the plane of the frame thereof. Unfortunately however the standard tractor hitch elevation is considerably below the necessary frame elevation of a vehicle of the class described. Where the vehicle is to be hitched optionally to a tractor or to another similar vehicle it therefore becomes necessary to provide means at one end of the vehicle, for effecting a hitch at two elevations.

With the above considerations in mind, an object of my invention is to provide an improved frame and drawbar construction. A further object of the invention is to provide a rigging for controlling the dumping doors, taking advantage of the improved drawbar construction to which reference is made.

Still a further object of the invention is to provide an improved structure by which the hitch may be made at the two optional elevations.

Figure 4:
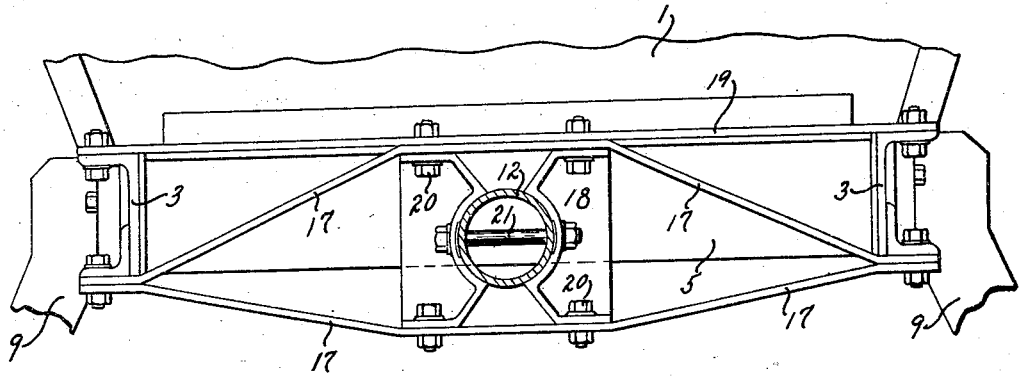
Figure 5:
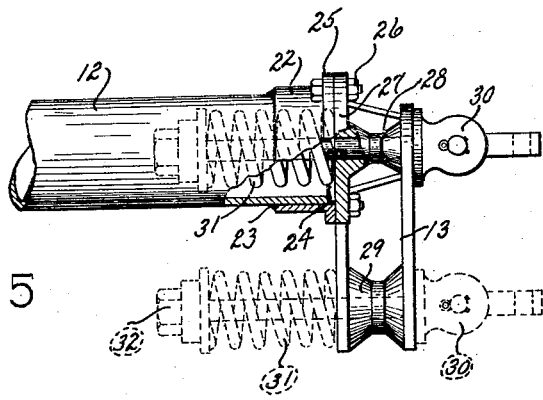
Figure 6:
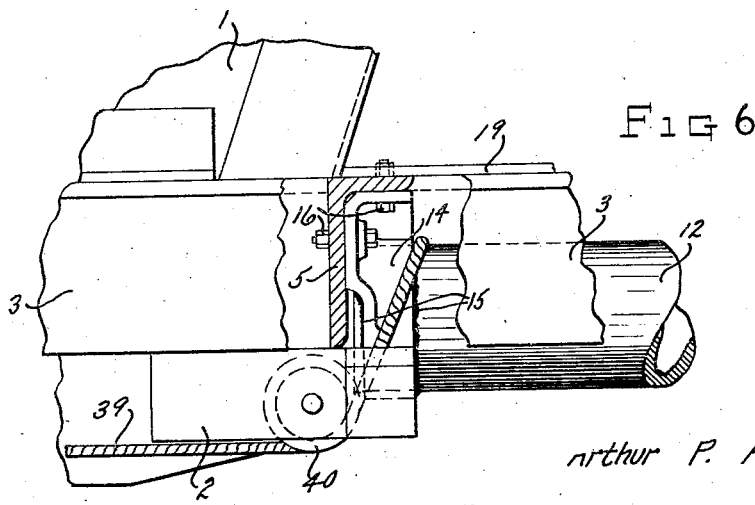

The exact nature of the invention together with further objects and advantages thereof will be apparent from the following description taken in connection with the accompanying drawings in which Figs. 1, 2 and 3 illustrate in side, front and rear elevations respectively a vehicle in which my invention is embodied, the dumping doors thereof appearing as closed Figs. 1 and 3 and partially open Fig. 2; Fig. 4 is a detail in transverse section as in the plane of line 4—4, Fig. 1; Fig. 5 is a detail in side elevation, of the forward portion of my drawbar, indicating in broken lines the optional hitch elevation; and Fig. 6 is a detail generally in side elevation but partly in section, with parts broken away, showing pertinent cooperative portions of the door rigging and drawbar.

With reference now to the drawings the body of the vehicle comprises as its principal parts a load-receiving hopper 1 supported upon a frame and provided with dumping doors 2. The frame is fabricated of structural steel and comprises a pair of side members 3 shown as of angle section with rear and forward members 4 and 5 transversely extending therebetween. These frame members are arranged about the bottom of the hopper 1 and define the rectangular dumping opening of the vehicle. The doors 2 are arranged to control the dumping of the load through this opening, and for the purpose each is hinged to swing from horizontal closed position, downwardly and outwardly to depending dumping position.

The frame is supported on its running gear in sufficiently elevated position that the doors 2 may clear the ground when dumping. The running gear is preferably of endless tread type, well known in the art, and as conventionally illustrated herein comprises on either side of the vehicle an endless tread linkage 6 trained about a pair of idler wheels 7, the idler wheels being carried by a rock beam 8 which has pivotal connection with the vehicle body through the medium of a bracket 9 secured with the frame side member, the bracket having a stub shaft 10 to carry the beam 8; and the two brackets 9 and the frame being reinforced by a transverse axle member 11.

At its forward end the vehicle is provided with drawbar means including a tubular tongue member 12 carrying at its forward end a depending hitch member 13. The tongue member 12 of the drawbar is arranged generally in the plane of the vehicle frame and extends forwardly from the forward transverse member 5 thereof. The tongue member is secured with the frame member 5 by a bracket casting 14. For the purpose, as indicated Fig. 6, the rear end of the tongue member 12 extends through a suitable opening in the bracket 14 and is peripherally welded thereto as indicated at 15; and the bracket is secured with the frame member 5 as by bolts 16.

The side frame members 3 extend considerably forward of the transverse frame member 5 as indicated Figs. 1 and 6, for the purpose of providing an intermediate support for the drawbar tongue member 12. To this end straps 17 are arranged transversely extending between the side frame members 3 to support a box casting 18 centrally thereof. Preferably a plate 19 is arranged about the projecting portions of the frame side members, and the box 18 is secured by bolts 20, the upper thereof passing through the plate 19 as well as the straps 17 and the shown flanges of the box. The box 18 has a central through opening, fitting the tongue member 12, and a bolt 21 serves to secure the tongue member in the box and thereby provide draft connection therebetween.

Thus the drawbar tongue member 12 is rigidly secured with the frame of the vehicle and generally in the plane thereof so that draft applied to the drawbar is effective upon the vehicle frame, and tilting of the frame upon the running gear may be controlled by the draft hitch at the forward drawbar end.

The forward end of the drawbar tongue member 12 carries a collar 22 welded on as indicated at 23 and 24, the collar fitting over but extending slightly beyond the tongue member end to accommodate the inner weld 24. The collar 22 has a flange 25 provided with holes to receive the bolts 26 by which the hitch member 13 may be secured, in depending arrangement as indicated, immediately to the collar 22 and therefore to the tongue member 12, the hitch member having a flange 27 for the purpose.

The hitch member 13 is generally of H section having a pair of transversely extending flanges with a longitudinally extending web therebetween. The web is enlarged to form vertically spaced bosses 28 and 29 each of which bosses is provided with a longitudinally extending through opening. Each opening is adapted to receive a draft member such as the usual eye bolt 30. This draft bolt preferably has associated therewith a draft spring 31 secured for compression under draft, between the hitch member 13 and the nut 32 turned onto the bolt.

The through opening in the upper boss 28 is aligned with the tongue member 12 of the drawbar so that when the draft bolt is employed with the upper of the two openings the spring 31 is received in the hollow of the tongue member as indicated Fig. 5. When the lower opening is used the spring 31 is rearward of the hitch member 13 and below the tongue member 12 as indicated Fig. 1 and in broken lines Fig. 5. The spacing of the openings in the hitch member is such that when the lower opening is employed the vehicle frame will be level when hitch is made by the draft bolt 30 with the drawbar of a tractor; and obviously when the upper opening is employed the hitch will be substantially in the plane of the vehicle frame. At the rear of the vehicle frame is provided hitch means 33 adapted for draft connection with the draft bolt 30 in the upper opening of the hitch member 13 of a similar vehicle. Obviously when such hitch is made the frames of the two connected vehicles will be level at the same time.

For operation of the dumping doors 2 a drum 34 is mounted on the rear end of the hopper 1 and arranged to be operated by handles 35. A line 36 is secured at one end on the drum 34, leads thence downwardly over a sheave 37, over a sheave 38 on the rear edge of one of the doors 2, forwardly in a stretch 39 along the free edge of the door, over a sheave 40 at the corresponding forward corner of the door, thence upwardly and over the drawbar tongue member 12 forwardly of the bracket 14; and thence back to the drum 34 with similar arrangement with regard to the other door 2. Thus, both ends of the line 36 being secured with the drum 34, rotation of the drum will draw in or pay out on both ends of the line 36 similarly and the doors will be correspondingly closed or opened. Such operation is had by proper manipulation of the handles 35 by an operator mounted on a step platform 41 properly located for the purpose.

It will be observed that the bend of the line 36 over the tongue member 12 allows an equalization of stresses in the two parallel lengths of the line, yet functioning of the line in its usual operation does not involve substantial movement thereof upon the tongue member.

What I claim is:
In a vehicle of the class described having a frame about a dumping opening and including a transverse member, a pair of doors for said opening mounted for swinging movement about the sides thereof, drawbar means including a tongue member secured with said transverse frame member and extending forwardly therefrom, and rigging for operating said doors and including a line having stretches associated with the free edges of said doors and an intermediate portion passing over said drawbar tongue member.

In testimony whereof I hereby affix my signature.

ARTHUR P. ARMINGTON.